United States Patent [19]
Kaempen et al.

[11] Patent Number: 5,981,050
[45] Date of Patent: Nov. 9, 1999

[54] COMPOSITE SHAPE FORMING STRUCTURE FOR SEALING AND REINFORCING CONCRETE AND METHOD FOR MAKING SAME

[76] Inventors: Charles E. Kaempen, 3020 Larkstone Dr., Orange, Calif. 92669-5546; Charles Robert Kaempen, 7070 Novaro Place, Alta Loma, Calif. 91701

[21] Appl. No.: 09/034,917

[22] Filed: Mar. 4, 1998

Related U.S. Application Data

[60] Provisional application No. 60/040,035, Mar. 5, 1997.

[51] Int. Cl.$^6$ .............................. B32B 17/12; B32B 31/16
[52] U.S. Cl. ...................... 428/294.7; 428/103; 428/105; 428/109; 428/113; 428/114; 428/119; 428/293.7; 29/897.34; 52/99; 52/678; 52/740.1; 52/740.2; 205/724; 205/734; 156/74; 156/169; 156/171; 156/190; 156/242; 156/289
[58] Field of Search .............................. 29/897.34; 52/99, 52/678, 740.1, 740.2; 205/734, 724; 238/26; 428/103, 105, 109, 113, 114, 119, 293.7, 294.7; 156/62.2, 74, 169, 171, 172, 173, 188, 190, 191, 242, 289

[56] References Cited

U.S. PATENT DOCUMENTS

| | | | |
|---|---|---|---|
| 4,410,586 | 10/1983 | Ladizesky et al. | 2/334 |
| 4,979,992 | 12/1990 | Bache | 106/644 |
| 5,336,589 | 8/1994 | Mukunoki et al. | 430/501 |
| 5,545,297 | 8/1996 | Andersen et al. | 264/102 |
| 5,549,859 | 8/1996 | Andersen et al. | |
| 5,658,624 | 8/1997 | Anderson et al. | 428/34.7 |
| 5,798,151 | 8/1998 | Andersen et al. | 428/34.5 |
| 5,837,315 | 11/1998 | Foltz et al. | 427/136 |

*Primary Examiner*—Terrel Morris
*Assistant Examiner*—Arti Singh
*Attorney, Agent, or Firm*—Finley & Berg, LLP

[57] ABSTRACT

A multiple ply composite structure used to reinforce, seal and shape concrete structures has a first ply formed of unidirected continuous filament reinforcements which are bonded together by a thermosetting polymeric resin matrix. A second ply comprises a plurality of separately spaced protuberances, each of which is individually coated with a hardenable thermosetting polymeric resin. The hardenable thermosetting polymeric resin of the second ply bonds the first ply to the second ply by forming a concave resin meniscus which anchors each of the protuberances of the second ply to the first ply.

23 Claims, 7 Drawing Sheets

COMPOSITE SHAPE FORMING STRUCTURE FOR SEALING AND REINFORCING CONCRETE AND METHOD FOR MAKING SAME

This application claims the benefit of U.S. Provisional application Ser. No. 60/040,035, filed Mar. 5, 1997.

BACKGROUND OF THE INVENTION

This invention relates to integral tensile-strength reinforcing materials applied to concrete structures.

The tensile strength of concrete is approximately one tenth that of its compression strength. For this reason, concrete structures subjected to bending or deflection, such as beams, roofs, columns, piling, and buried pipe must be reinforced by a material that increases its tensile strength.

The material most commonly used previously to reinforce concrete is carbon steel. Among the advantages of using carbon steel as a concrete reinforcement material are its low cost, its ready availability, its predictable physical properties and its long history of use and approval by building code committees.

However, in many applications serious problems have been encountered with the use of these carbon steel reinforcements. Corrosion of carbon steel reinforcing members has caused the deterioration of concrete bridge decks, concrete pipe and other concrete structures. For example, a primary cause of bridge deck deterioration is the cyclic freeze-thaw exposures and the reinforcing steel corrosion caused by the extensive use of de-icing salts.

Practical realities of the concrete formation process can exacerbate steel corrosion problems. For example, due to the shortage of fresh salt-free water in certain regions of the world, steel-reinforced concrete structures have frequently used saltwater in the concrete mix. When sea water was utilized in the concrete mix used to build reinforced concrete structures in Saudi Arabia, the resulting high internal chloride level of the concrete produced extensive corrosion of the steel reinforcement within the concrete as well as cracking, delamination and spalling of the concrete.

The steel bar and wire materials used to form and reinforce concrete are generally placed inside rather than outside the concrete structure, for several reasons. First, it is difficult and expensive to bond or otherwise attach steel reinforcement members to the exterior of concrete structures subjected to beam loads. Second, encasing the carbon steel reinforcement members within the alkaline concrete material protects the steel from corrosion due to acidic water.

However, the placement of steel reinforcements within the concrete structures they reinforce presents numerous drawbacks. In a typical concrete beam, its bottom exterior surface bears the greatest tensile load. Accordingly, placement of the steel reinforcement within the concrete beam fails to support the beam at its weakest point. Internally placed steel reinforcements do not enclose the outer surface of the concrete, and thus provide no protection for the outer surface from water intrusion or leaking. Similarly, internally placed steel reinforcements do not prevent concrete from spalling or breaking loose in crisis conditions such as an earthquake. Furthermore, steel reinforcements placed within a reinforced concrete structure are hidden from view and are thus difficult and expensive to inspect.

In order to avoid problems with corrosion, makers of concrete structures have turned to nonmetallic materials as alternatives to carbon steel reinforcements. For example, steel reinforcing bars can be replaced by pultruded bars of fiber-reinforced plastic ("FRP") or filament-wound FRP tubular structures, or steel mesh can be replaced by FRP grating or screens. These materials, however, are used as internal reinforcements. Thus, their use does not alleviate the problems described above found with all internally placed reinforcements.

Corrosion-resistant stainless steel fibers or alkaline-resistant fiberglass fibers may be intermixed or otherwise placed within concrete before it hardens in order to increase the tensile strength of the concrete. However, this method fails to protect the outer surfaces of the concrete structures it reinforces, and further requires high cost and complex mixing procedures in order to provide uniform dispersion of the reinforcing fibers within the concrete.

Certain externally-mounted structures have also been explored as alternative means to reinforce concrete. For example, paper-thin polymeric composite laminates, made in the form of sheets, can be bonded to the exterior surface of a dry concrete structure. Such composite laminates, made from continuous carbon fibers and a prepreg epoxy resin, have been used to reinforce or repair concrete bridge decks and concrete walls. In California, polymeric composite materials containing continuous filament reinforcements have been used after earthquakes to reinforce fully cured concrete column structures that support automotive highways. These composite sheet reinforcements are usually bonded to a dry concrete surface with a thin layer of epoxy resin adhesive.

These external surface concrete reinforcements are expensive to make and apply and their reinforcing strength depends upon the bond strength between the composite laminate and the concrete surface material. Because the composite laminates are not bonded to the concrete until after the concrete has already been cured, no truly intimate bond between the laminate and the concrete can be made. Furthermore, the bond strength which can be established between the laminates and the concrete is vulnerable to the low peel strength characterizing epoxy adhesives. Long term exposure to weathering and severe temperature changes can also cause the thin composite sheet to delaminate from the concrete structure.

Beyond reinforcements, external structures used in the creation of concrete structures include shaping forms into which wet concrete can be poured and maintained in a desired shape until it dries. If external conditions are such that ice forms in the concrete while it dries, the concrete can lose nearly half its potential design strength, even though cement hydration can be reestablished upon re-warming the frozen concrete. Keeping concrete warm or using accelerators to reduce the curing time increases the cost of the concreting job. Thus, to control the temperature of the concrete as it dries, these forms have been made of thermally insulative materials. However, these forms have not also served to reinforce the completed concrete structure or permanently seal its outer surface.

Shaping forms are used in the formation of centrifugally cast concrete pipes. One characteristic of these pipes has been that, due to unavoidable variations in the quantity of concrete placed within the rotating form, the pipe cannot be made to possess identical internal diameters.

Conventional concrete pipe liners, such as those cast within the concrete, are usually made of flexible sheets of thermoplastic materials that do not increase the structural strength of the pipe. The interior of conventional concrete sewer pipe is commonly protected from the corrosive effects of the sulfuric acid produced by hydrogen sulfide in sewer gas, by cast-in-place pipe liners made of poly vinyl chloride. These pipe liners sometimes have protrusions which are pushed into the wet concrete in order to anchor the liner to the concrete. However, these protrusions are not formed to be integral structural constituents of the concrete pipe.

One particular method used to attach pipe liners to concrete pipes has been to extend circumferentially spaced extruded tee shapes longitudinally within the pipe wall. A downside of this method is that the concrete is weakened in direct proportion to the depth of the plastic anchor tee. Such "tee locks" provide longitudinal grooves that serve as built-in stress-risers that can produce fractures in the concrete pipe structure when the pipe is shifted during earthquake or other soil motion events.

One attempt to create a concrete liner having protrusions which can be made internal structural constituents of the concrete is known. To create this liner, a laminate surface was coated with a bonding resin, and rock aggregate particles were sprinkled upon the resin. The rock aggregate particles were then embedded in fresh concrete. However, it was found that the resulting bond strength for the liner was limited to the tensile strength of the hardened resin present between the bottom of the rock particle and the laminate surface with which it was in contact. This particle bond strength was found to be less than the tensile strength of either the rock particles or the concrete. For this reason, such aggregate covered laminates were deemed not suitable as concrete reinforcement constituents.

SUMMARY OF THE INVENTION

A multiple ply composite structure is provided for reinforcing, sealing, and shaping concrete. A first ply of the inventive composite structure is formed of unidirected continuous filament reinforcements which are bonded together by a thermosetting polymeric resin matrix. A second ply of the inventive composite structure comprises a plurality of separately spaced protuberances, each of which is individually coated with a hardenable thermosetting polymeric resin. The hardenable thermosetting polymeric resin of the second ply bonds the first ply to the second ply by forming a concave resin meniscus which anchors each of the protuberances of the second ply to the first ply.

A primary object of the current invention is to provide a fiberglass composite laminate for shaping, sealing and structurally reinforcing a wide variety of concrete structures, including beams, bridge decks, roofs, floors and tilt-up building panels.

Another object of the current invention is to provide a fiberglass laminate structure bonded to individual rock particles such that the bond strength between the rock particles and the fiberglass laminate at least equals the tensile strength of the rock particles.

A further object of the invention is to provide a corrosion-resistant replacement for the steel wire and reinforcing bars currently used to increase the tensile strength and fracture-resistance of concrete structures.

Yet another object of the invention is to provide an impermeable exterior surface for a concrete structure, such as a bridge deck, building wall or concrete pipe, that is able to resist the effects of weathering or continuous exposure to corrosive liquids.

A still further object of the invention is to provide a thermally insulative non-removable shape-forming structure for forming concrete that inhibits the loss of exothermic heat to the surrounding atmosphere and prevents loss of water from the concrete as it cures.

Yet another object of the invention is to provide a permanent external concrete reinforcement that does not delaminate or separate from the concrete as a result of low peel strength, earthquake shock, explosive pressures, or dimensional changes resulting from extremes in surface temperature.

A still further object of the invention is to provide a corrosion-resistant concrete pipe liner that enables a concrete pipe having a given wall thickness to increase its resistance to stresses produced by internal pressure and bending moments resulting from such events as earthquake, faulty handling and improper pipe installation.

Yet another object of the present invention is to provide a concrete cylinder, such as pipe, poles, piling and tanks with an exterior as well as interior laminate reinforcement.

A still further object of the present invention is to provide a method of folding and installing an aggregate-covered composite pipe liner in a centrifugally-cast concrete pipe to make a centrifugally-cast concrete pipe having identical internal diameters.

DESCRIPTION OF A PREFERRED EMBODIMENT

The present invention provides a composite laminate structure which may be bonded to a concrete member with a bond strength at least equal to the bond strength of the concrete. This was made possible by the discovery that when clean dry rock aggregate particles are completely coated with a thermosetting resin prior to being placed on a dry composite laminate surface, and there remain stationary until the bonding resin hardens, the resulting bond strength of the rock aggregate particles to the laminate will exceed the tensile strength of any concrete material that subsequently may be cast to enclose the rock aggregate particles. This high particle-to-laminate bond strength is primarily due to the complete enclosure of each rock aggregate particle with a resin shell and the anchoring strength of a concave meniscus of resin formed when the resin flows toward the panel structure.

Figure 1:
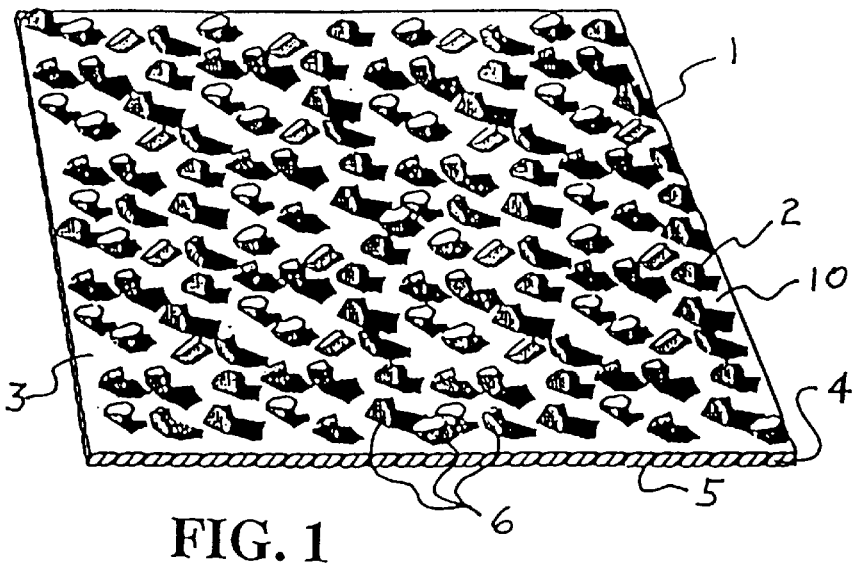
FIG. 1. is a partially-sectioned perspective view showing the resin-coated spaced rock aggregate bonded to a flat laminate concrete reinforcement structure.
Figure 2:
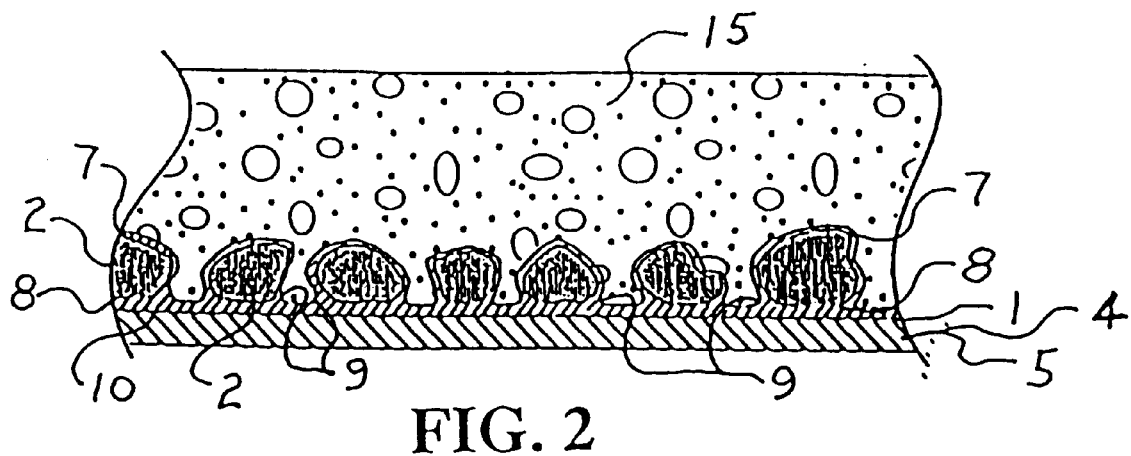
FIG. 2 is an enlarged side elevation cross section view showing the concave resin meniscus that anchors each resin-coated rock particle to the composite panel.

Referring to FIG. 1 of the drawings, there is illustrated a preferred aggregate-covered composite laminate panel 1 of the present invention. Aggregate-covered composite laminate panel 1 comprises a single ply thickness of appropriately spaced resin-coated rock aggregate protuberances 2 bonded to one side 10 of a unidirected composite laminate panel structure 3. Unidirected composite laminate panel structure 3 contains at least one ply of parallel strands of continuous filament reinforcements 4 which are impregnated and bonded together with an impermeable thickness of a thermosetting polymeric resin 5. A single ply thickness of resin coated rock protuberances 2 comprises a plurality of rock aggregate particles 6. Preferably rock aggregate particles 6 are spaced 1 millimeter to 20 millimeters apart. While rock aggregate particles 6 will typically have an irregular shape, each rock aggregate particle 6 preferably is shaped such that any cross section through what is roughly the center of the particle has a width in the range of from 3 millimeters to 20 millimeters. Referring now to FIG. 2, each rock aggregate protuberance 2 is individually covered with a hardenable thermosetting polymeric resin 7. The application of a force, such as gravity or centrifugal force, causes hardenable resin 7, while still wet, to flow to the base 8 of each rock aggregate protuberance 2, and to harden to form a concave meniscus anchor 9 that connects and bonds each rock aggregate protuberance 2 to side 10 of unidirected composite laminate panel structure 3.

FIG. 2 depicts an enlarged cross section view of a concrete structure 15 reinforced by aggregate-covered composite laminate panel 1. This enlargement shows how each individual rock aggregate protuberance 2 is bonded to the exterior surface of the composite laminate 10 by the hardened shell of resin 7 and the hardened concave resin meniscus anchor 9 formed between the rock 2 and the interior composite laminate surface 10 to provide a composite laminate anchor structure. The concrete of concrete structure 15 encloses each rock aggregate protuberance 2 such that aggregate-covered composite laminate panel 1 becomes a structural constituent of concrete structure 15.

A composite laminate reinforced concrete structure such as concrete structure 15 can be constructed by applying wet concrete to the aggregate-covered side 10 of unidirected composite laminate panel structure 3, or alternatively, by embedding the ply of resin-coated rock aggregate protuberances 2 into a wet concrete surface. Preferably the parallel strands of continuous filament reinforcements 4 and thermosetting polymeric resin 5 are composed of substances which form a waterproof, insulating surface for the concrete structure. Aggregate-covered composite laminate panel 1 will then, in addition to providing structural reinforcement, inhibit deterioration of the reinforced concrete caused by acidic water and reduce water evaporation to prevent the concrete from losing design strength as it cures.

Figure 3:
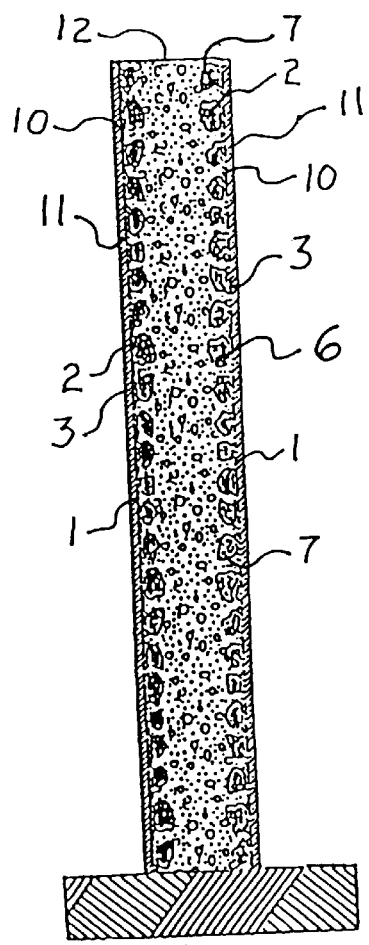
FIG. 3 is a side elevation cross section view of a concrete wall panel having an aggregate-covered impermeable composite laminate structure bonded to both outer wall surfaces.

FIG. 3 illustrates a preferred embodiment of the invention in which aggregate-covered composite laminate panel 1 is used as a tensile strength reinforcement 11 for a concrete wall structure 12. Aggregate-covered composite laminate panel 1 is bonded to the exterior unreinforced portion of the concrete structure 12.

Figure 4:
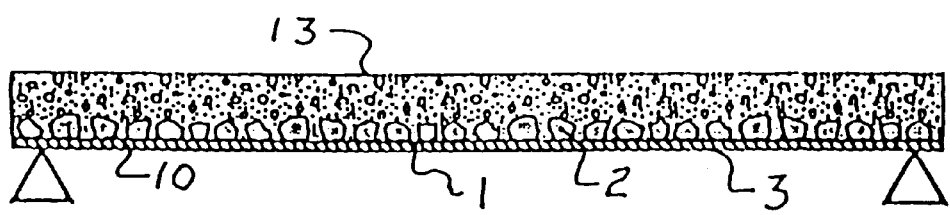
FIG. 4 is a side elevation cross section view of a simply supported concrete beam comprising an aggregate-covered composite laminate as an external bottom structural constituent of the concrete beam.
Figure 5:
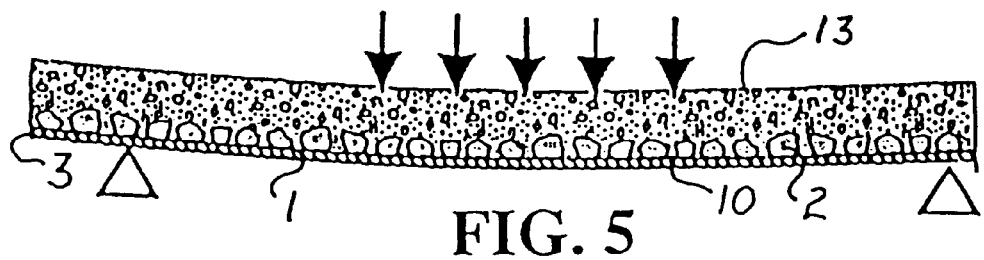
FIG. 5 is a side elevation cross section view showing the simply supported concrete beam of FIG. 3 undergoing a stress-producing increase in the length of its bottom surface when it is under a load.

Another preferred embodiment of the invention utilizing aggregate-covered composite laminate panel 1 is illustrated in FIGS. 4 and 5. A simply supported concrete beam 13 employs the aggregate-covered composite laminate panel 1 as an external bottom structural reinforcement that resists the external surface tensile stress that results when the concrete beam 13 is loaded.

Figure 6:
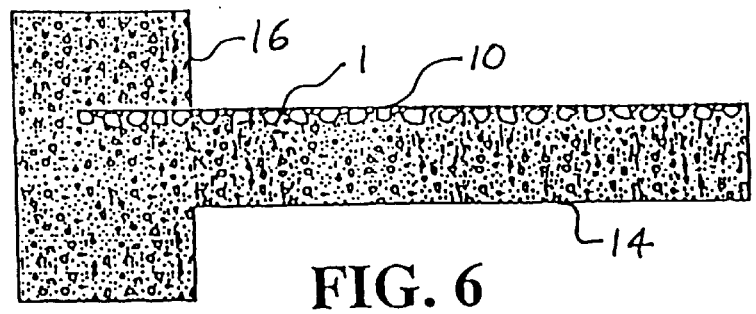
FIG. 6 is a side elevation cross section view of a cantilever concrete beam attached to a concrete wall, the concrete beam having an aggregate-covered composite laminate as an external upper structural constituent.
Figure 7:
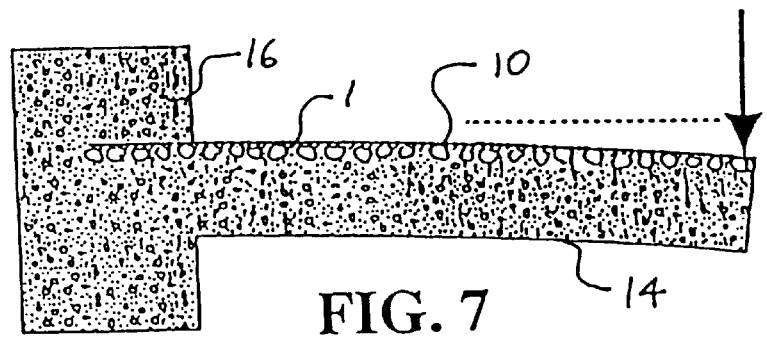
FIG. 7 is a side elevation cross section view showing the cantilever concrete beam of FIG. 5 undergoing a stress-producing increase in the length of its upper surface when it is subjected to a concentrated load.

FIGS. 6 and 7 depict another preferred embodiment in which aggregate-covered composite laminate panel 1 is used to reinforce a cantilever concrete beam 14 which is set into a concrete wall 16. In this embodiment, aggregate-covered composite laminate panel 1 acts as an external upper structural constituent of concrete beam 14. It should be noted that such a cantilever concrete beam 14 could be further reinforced by a second aggregate-covered composite panel acting as an external lower structural constituent.

Figure 8:
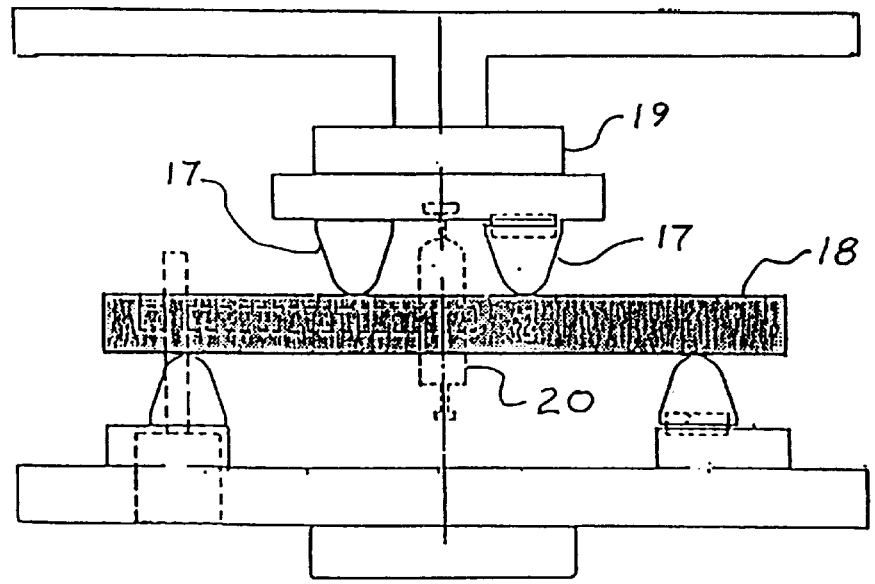
FIG. 8 is a side elevation schematic view of a concrete beam test apparatus with beam displacement sensors.
Figure 9:
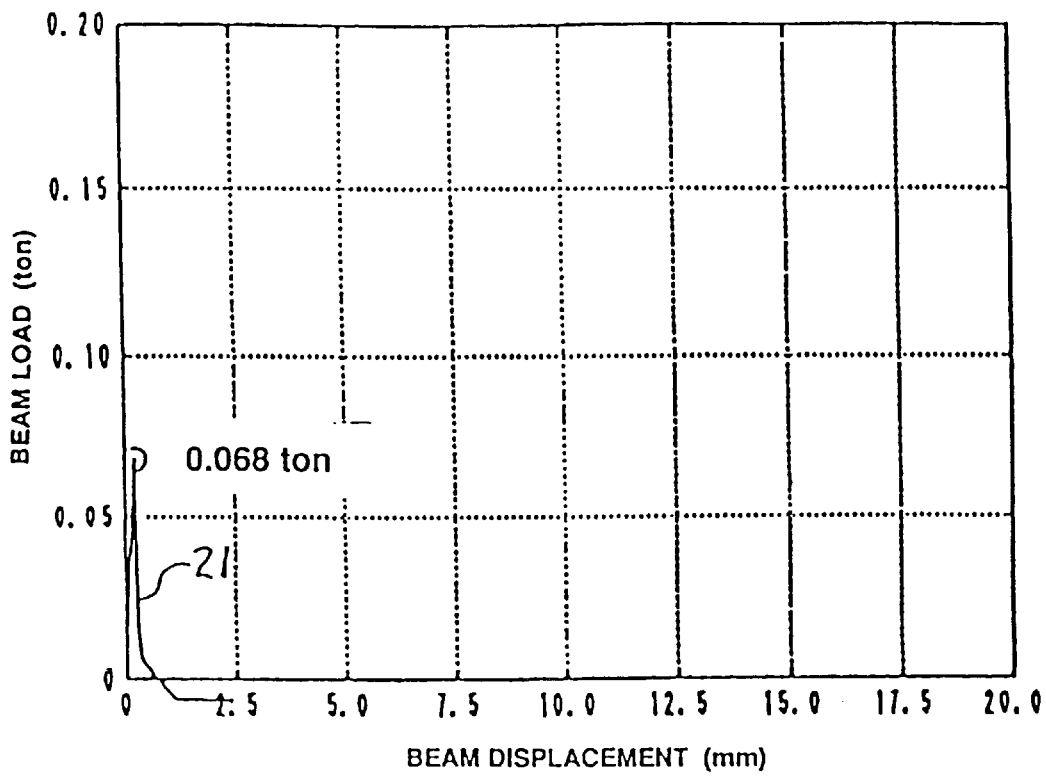
FIG. 9 is the plot of load vs. displacement of a 30 millimeter thick unreinforced concrete beam that was tested by the apparatus shown in FIG. 8.

To determine the effectiveness of the present invention to increase the tensile strength of a concrete beam, the 20 ton compression machine shown in FIG. 8 was used to test the load resistance of four concrete beams. FIG. 8 schematically illustrates the arrangement of the two beam loading noses 17 and the concrete beam specimen 18. The beam testing apparatus was equipped with a movable anvil 19 that moved vertically at a rate of 2.5 millimeters per minute to impart a load to the specimen. An electric displacement sensor 20 measured the beam deflection. Each concrete beam specimen 18 measured 100 millimeters in width and 400 millimeters in length. A first 30 millimeter thick concrete beam specimen was cast without any bottom reinforcement and served as a reference. FIG. 9 shows the actual plot of load versus deflection 21 when the plain unreinforced concrete beam specimen was tested. Without any reinforcement, the specimen quickly broke in two after resisting a load of only 0.068 metric tons (68 kg).

Figure 10:
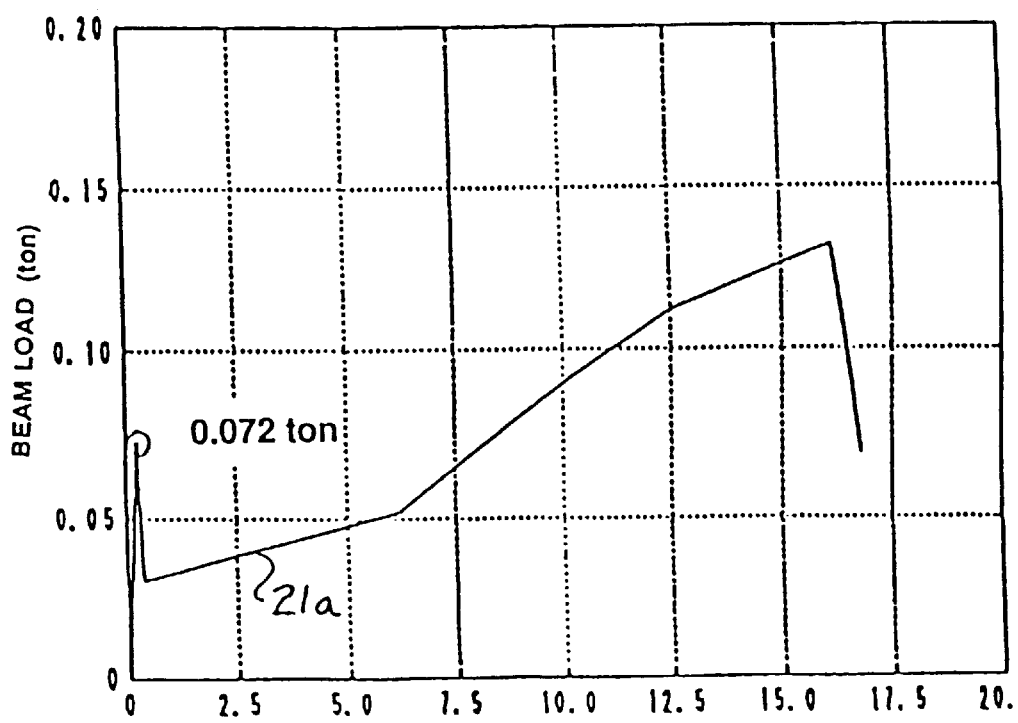
FIG. 10 is the plot of load vs. displacement of a 30 millimeter thick concrete beam having a sheet of aluminum bonded to the beam bottom that was tested by the apparatus shown in FIG. 8.

A second 30 millimeter thick concrete beam specimen was reinforced with a thin 1 millimeter thick sheet of aluminum glued to the bottom of the concrete beam. As can be seen from the plot of load vs. deflection 21a in FIG. 10 this reinforcement enabled the concrete beam to resist a slightly greater load before breaking. However, due to the aluminum reinforcement sheet glued to the bottom of the specimen, the fractured concrete beam remained together while undergoing a bending deflection of 16 millimeters at which time the aluminum sheet delaminated from the concrete. This test demonstrated that the bonding resin peel-strength is more important than the bonding resin tensile or shear strength when bonding a thin sheet reinforcement to the surface of cured concrete.

A third 30 millimeter thick concrete beam specimen was reinforced by an aggregate-covered composite laminate panel constructed according to the present invention and was also tested by the apparatus shown in FIG. 8. To construct the third beam specimen, a wet concrete mixture was poured upon a flat aggregate-covered composite laminate panel similar to that illustrated in FIG. 1, and was smoothed and allowed to dry.

Figure 11:
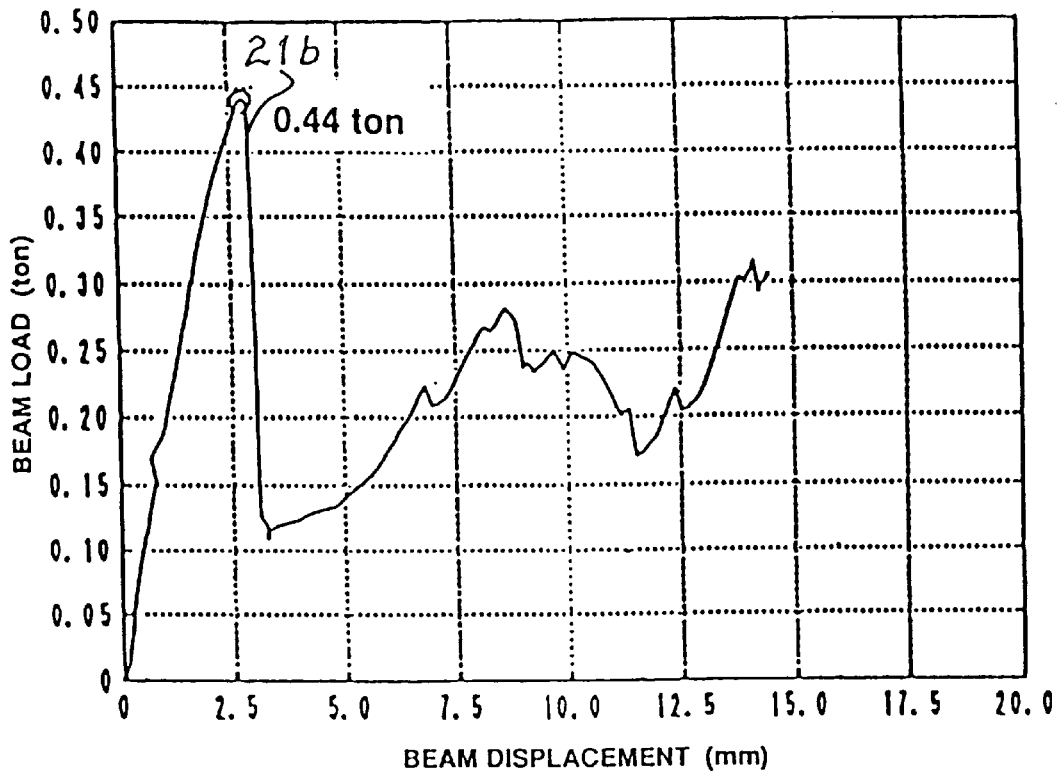
FIG. 11 is the plot of load vs. displacement of a 30 millimeter thick concrete beam having an aggregate-covered laminate bonded to the beam bottom that was tested by the apparatus shown in FIG. 8.

FIG. 11 shows the load vs. displacement plot 21b when the third beam specimen was tested with the 20 ton compression machine. The test showed that the composite reinforced concrete beam was able to deflect approximately 10 times the distance of a conventional concrete beam before it fractures. This indicates a substantial increase in the ability of the concrete structure to withstand earthquakes. The plot 21b shown in FIG. 11 also illustrates that before the concrete beam fractured it was able to resist a load more than six times greater than an unreinforced conventional concrete beam. This means that load-bearing concrete structures such as building floors, streets and sidewalks can be produced at a much lowered cost. Plot 21b also indicates that following the concrete beam fracture, the concrete beam member did not come apart, but remained intact and continued to resist a load while its displacement distance continued to increase. This greatly reduces the hazard that concrete pieces will break off and fall when concrete structures are subjected to earthquake or explosion.

Figure 12:
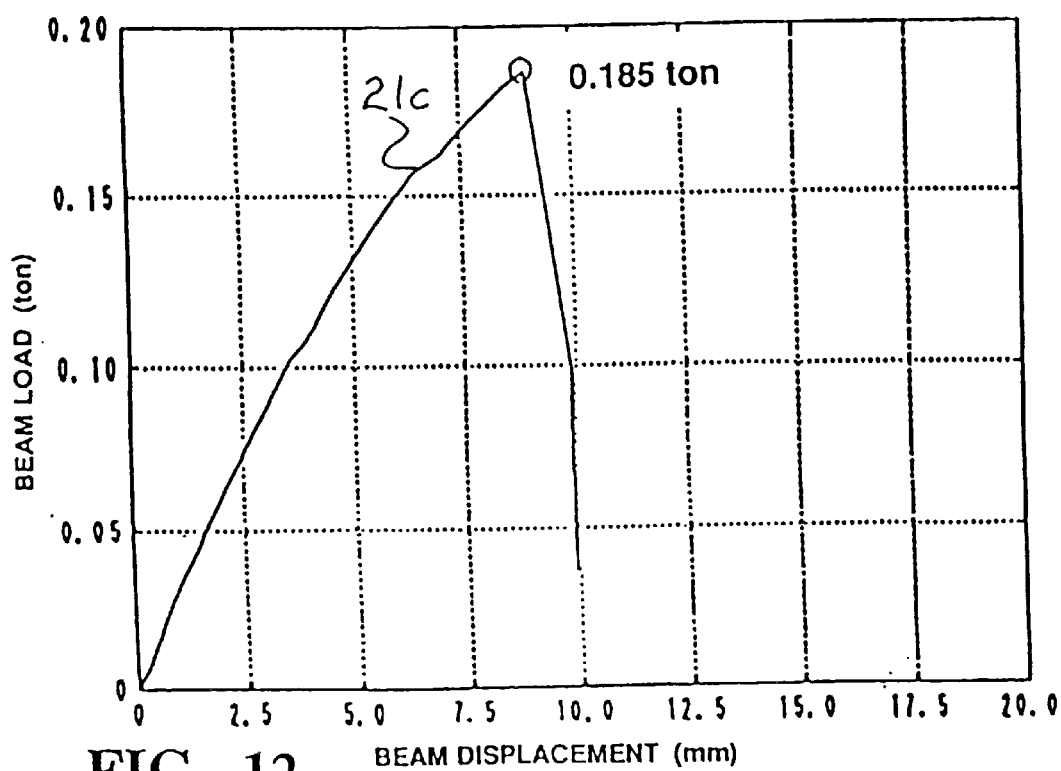
FIG. 12 is the plot of load vs. displacement of a 15 millimeter thick concrete beam having an aggregate-covered laminate bonded to the beam bottom that was tested by the apparatus shown in FIG. 8.

The fourth beam specimen which was tested by the 20 ton compression machine of FIG. 8 was a composite-reinforced beam having identical characteristics to the third beam specimen except having half the beam thickness: 15 millimeters. FIG. 12 shows the load vs. displacement plot 21c for the test of the fourth beam specimen. Despite the substantial reduction in beam thickness, plot 21c indicates that when a concrete beam is reinforced with the inventive aggregate-covered composite laminate panel the beam strength is 2.5 times greater than an unreinforced concrete beam twice as thick. Accordingly, the present invention can be used safely and economically to provide strong concrete structures using substantially less concrete material than is presently used in concrete construction. If a high rise structure can reduce its weight of concrete it is not only less expensive to build, but is also safer when subjected to earthquake.

A preferred method of manufacture of the inventive composite laminate structure is described as follows. The process of making this composite laminate structure can be divided into two main steps.

The first step is to manufacture the unidirected composite laminate panel structure 3. A flat and smooth panel forming surface is chosen having the same shape as the desired panel. In the preferred embodiments described above and pictured in FIGS. 1 to 7, the panels have a rectangular shape; however, a panel can have any contour appropriate to reinforce a particular concrete structure. The panel forming surface is coated with a resin release agent, and then is covered with a first layer of a liquid hardenable thermosetting resin. In practice, such a panel is made using a thermosetting isophthalic polyester resin matrix, having a weight of 0.121 pounds per square foot (0.60 kilograms per square meter). An acceptable polyester resin is Aropol No. 7240 from Ashland Chemical that has a viscosity of 350 centipoise. This resin is promoted with 0.5% of cobalt naphthenate by weight and catalyzed with 1.5% MEK peroxide. The resin is then cured until it is firm.

Next, either one or two layers of a dry fiberglass cloth should be placed upon the partially-cured resin. In practice, where only one layer of fiberglass cloth has been used, the fabric is 0.5 millimeter thick, has a weight of 0.81 pounds per square yard (0.44 kilograms per square meter), and is made from strands containing continuous filaments of E glass. The E glass filaments preferably have a filament diameter of 25 microns, a roving yield of 450 yards per pound (905 meters per kilogram), and a strand spacing of 9 per inch. Such a fiberglass cloth may be obtained from Composite Materials Incorporated as KNYTEX A 130 or from Fiber Glass Industries as Fortesil 1300. Where two layers of fabric have been used, a second preferred fiberglass fabric was used in addition to the first. This second preferred fiberglass fabric is 0.25 millimeter thick and has a dry weight of 6 ounces per square yard (0.21 kilograms per square meter). Such a fabric may be obtained from Mutual Industries, Inc. as Style 7628 woven fiberglass cloth.

Where two layers of fabric are used, the second fiberglass fabric preferably is first placed on the partially-cured resin. It is then coated with a second layer of resin. The second layer of resin may use the same type of resin used for the first resin layer. The fiberglass cloth layer composed of E glass filaments is then placed on top of the second resin layer.

At this point, either the first or second layer of fabric constitutes the top layer of the forming composite laminate surface. The fabric of this first or second layer should also be covered with a third layer of resin. Again, the third layer of resin may use the same type of resin used to make the first resin layer. This new resin covering should be smoothed across the surface of the top resin layer to coat uniformly the parallel filaments of the fiberglass cloth. Such smoothing may be done with a squeegee. At this point, the resin layers should be cured until they are non-liquid, forming the completed unidirected composite laminate panel structure 3. When made from the materials described above, unidirected composite laminate panel structure 3 will be about 1 millimeter thick and have a tensile strength in the direction of the fiberglass strands in excess of 281 kilograms per centimeter (1400 pounds per inch).

The second step for making the inventive aggregate-covered composite laminate panel is to form the second ply of resin-coated rock aggregate protuberances 2 upon the unidirected composite laminate panel structure 3. In forming this second ply, another liquid hardenable thermosetting polyester resin is used, preferably having a viscosity in the range of 350 to 1000 centipoise. The Ashland Chemical Co. resin Aropol No. 7240, promoted with cobalt naphtenate and catalyzed with MEK peroxide as above is well-suited for this purpose. Also used is crushed rock aggregate, clean and dry, with each particle preferably having every cross-sectional width through its center in the range of from 0.5 cm to 1 cm. The rock aggregate particles should be placed into a container filled with the resin and removed when coated with a resin coat from 0.1 to 0.5 millimeters thick. The aggregate particles are then placed upon unidirected composite laminate panel structure 3 as rock aggregate protuberances 2 such that they are separated from each other by a distance ranging from 1 millimeter to 20 millimeters.

A protuberance spacing apparatus (not shown) may be used to properly space out the aggregate protuberances 2 on the unidirected composite laminate panel structure. A preferred embodiment of a protuberance spacing apparatus comprises a metal or plastic sheet upon which the resin-coated aggregate protuberances are manually spaced out. The aggregate-covered side of the sheet may be pressed against the composite laminate panel structure before the resin hardens and the sheet may be removed, leaving the aggregate protuberances properly spaced across the laminate surface. It should be understood that other protuberance spacing apparatus could be employed.

The resin coating the aggregate protuberances is then subjected to a force normal to the upper surface of the unidirected composite laminate panel structure. This force can simply be gravity, in which case the panel should simply be placed aggregate-side up. However, other forces can be used. For example, with a cylindrical composite laminate form, as used in concrete pipe liners, centrifugal force may be applied by rotation of the composite laminate.

The application of the force should be continued until the resin 7 has flowed to the base 8 of each aggregate protuberance 2 to form the concave resin meniscus anchors 9 bonding each aggregate protuberance 2 to the composite laminate panel. The resin should then be fully cured. At this point the reinforcing aggregate-covered composite laminate panel is completed.

Figure 13:
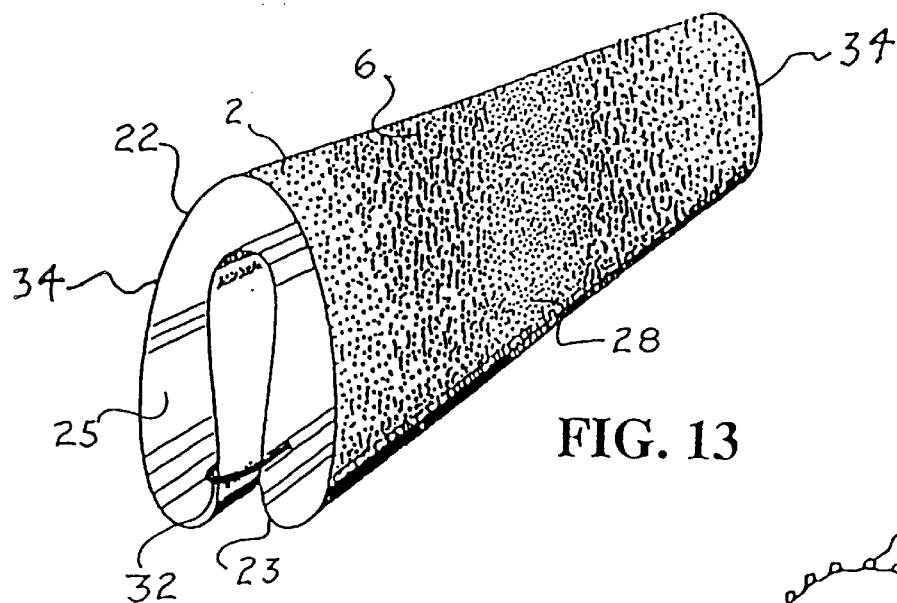
FIG. 13 is a perspective view of the folded configuration of an aggregate-covered composite liner used to seal and reinforce a centrifugally cast concrete pipe.
Figures 14, 15:
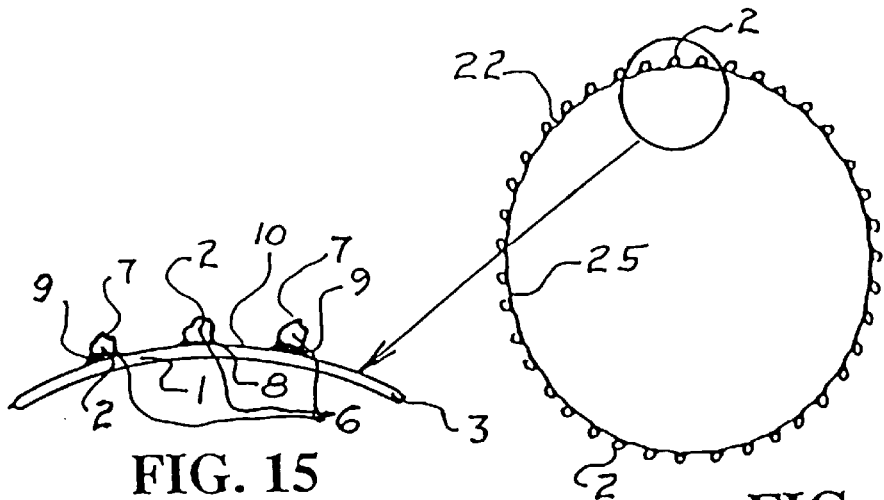
FIG. 14 is a cross section view of the aggregate-covered concrete pipe liner after it has been imbedded in a rotating mixture of wet concrete.
FIG. 15 is an enlargement of a portion of the aggregate-covered concrete pipe liner showing the resin meniscus that anchors the aggregate to the composite laminate.

The present invention may also be utilized to provide an aggregate-covered composite concrete pipe liner. FIG. 13 illustrates a preferred concrete pipe liner embodiment 22 which is prepared for insertion into a wet concrete pipe. Liner embodiment 22 comprises a folded cylindrical composite laminate 23 covered with a ply of resin-coated rock aggregate protuberances 2. FIG. 14 shows a cross section of the unfolded configuration 25 of the pipe liner 22. FIG. 15, which shows an exploded view of the surface of pipe liner 22, depicts that these resin-coated rock aggregate protuberances 2 are, as in composite laminate panel 1, anchored to the cylindrical composite laminate 23 by a concave resin meniscus 9 formed when a layer of hardenable thermosetting polymeric resin 7 coating the rock aggregate protuberances 2 flows to the base 8 of each rock aggregate protuberance 2.

Figures 23, 24:
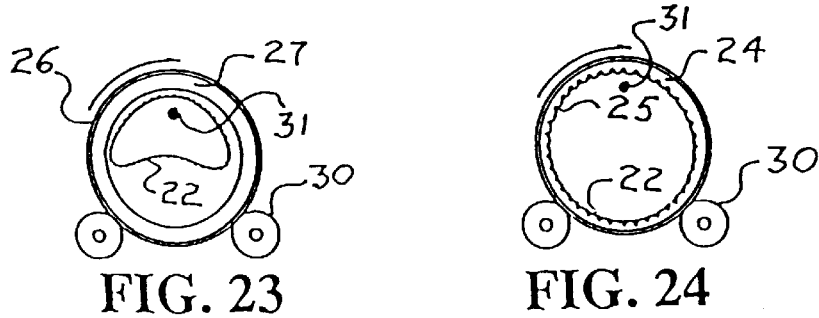
FIG. 23 depicts the schematic view of FIG. 22 wherein the aggregate-covered composite pipe liner has further unfolded due to centrifugal force.
FIG. 24 depicts the schematic view of FIG. 23 wherein the aggregate-covered composite pipe liner has completely unfolded and become a structural constituent of the pipe.

Liner embodiment 22 can be used as a liner for a centrifugally cast concrete pipe 24 (see FIG. 24). As before, the bond between the liner embodiment 22 and the centrifugally cast concrete pipe 24 has a tensile and shear strength at least equal to the tensile and shear strength of rock aggregate protuberances 2.

A preferred method of manufacture of a concrete pipe using the inventive liner embodiment 22 is described as follows. The preferred liner embodiment 22 constructed as described below had a 600 millimeters (24 inch) diameter and a wall thickness of approximately 1.5 millimeters (0.06 in), and was able to resist a pressure of 856 Kpa (125 psi) and an end load greater than 37 tons. The process of making the concrete pipe using liner embodiment 22 can be divided into three main steps: making the cylindrical composite laminate structure, applying the resin-coated aggregate particles to the cylindrical composite laminate structure, and making the aggregate-coated cylindrical composite laminate structure a structural constituent of a concrete pipe.

To make the cylindrical composite laminate structure, a cylindrical mandrel is used having a mandrel forming surface with the same length and diameter desired for the liner embodiment 22. The cylindrical mandrel is mounted into a filament winding machine and the mandrel forming surface is coated with a resin release agent. The mandrel forming surface is then covered with a first layer of a liquid hardenable thermosetting resin. In practice, the resin used in the preferred liner embodiment was again the thermosetting isophthalic polyester resin matrix Aropol No. 7240 from Ashland Chemical, with a weight of 0.15 pounds per square foot and a viscosity of 350 centipoise. The resin was promoted with 0.5% of cobalt naphthenate by weight and catalyzed with 1.5% MEK peroxide. However, it should be understood that other resins could be used. This first layer of liquid hardenable thermosetting resin should then be partially cured until it is firm.

Next, a 0.1 millimeter thick piece of dry woven fiberglass fabric is placed upon the partially-cured first layer of liquid hardenable thermosetting resin. A preferred fabric to use is a 0.1 millimeter layer of Style 7628 fiberglass cloth impregnated with Derakane 470-36 epoxy vinyl ester resin, available from Dow Chemical Co. This dry woven fiberglass fabric piece should have a dry weight of approximately 6 ounces per square yard. A second layer of liquid hardenable thermosetting resin is then applied to cover the piece of dry woven fiberglass fabric and allowed to impregnate the fabric piece. Preferably, this resin is the same Aropol No. 7628 used for the first resin layer. This second layer of resin should be approximately 0.25 millimeter thick.

Next, a 0.5 millimeter thick piece of dry unidirected fiberglass fabric is placed upon the second layer of resin. This fabric preferably has a weight of 0.44 kilograms per square meter (0.81 pounds per square yard) and is made from strands containing parallel, continuous filaments of the borosilicate glass referred to as E glass. These continuous filaments preferably have a filament diameter of 25 microns, a roving yield of 450 yards per pound (905 meters per kilogram), and a strand spacing of 9 per inch. Such fabric is available from Composite Materials Inc (CMI) as KNYTEX A 130 or from Fiber Glass Industries, (FGI) as Fortesil 1300. The fabric should be oriented so that the parallel filaments parallel the longitudinal axis of the cylindrical mandrel and remain in that orientation until they absorb resin from the second layer of resin by capillarity.

Next, a 0.75 millimeter thick filament winding ribbon should be prepared from parallel, continuous strands of E glass fiberglass roving. The preferred filament winding ribbon has a filament diameter of 25 microns, a roving yield of 450 yards per pound (905 meters per kilogram), and a strand spacing of 9 per inch. Such a filament winding ribbon is available from Owens Corning Fiberglass, Certainteed Corp., PPG, or FGI. The filament winding ribbon is dipped into a third liquid hardenable thermosetting resin, which again may be the same resin used for the first and second layers of resin. The resin-wet filament winding ribbon is then filament wound upon the piece of dry unidirected fiberglass fabric. In this process, the piece of dry unidirected fiberglass fabric will become impregnated with the third liquid hardenable thermosetting resin as well. At this point, the layers of resin should be fully cured, finishing the first step and forming a completed cylindrical composite laminate structure.

In the second step, applying the resin-coated aggregate particles to the cylindrical composite laminate structure, the cylindrical composite laminate structure is first removed from the mandrel and placed on top of a horizontal surface. The cylindrical composite laminate structure is then flattened so that its upper hemispherical surface becomes roughly planar and the upper and lower surfaces of the composite laminate structure are brought closely together. The flattened upper surface should form a first aggregate-applying surface which extends along the entire length of the cylinder and has a width equal to approximately one third of the circumference of the cylinder. The aggregate-applying surface should be sufficiently planar such that resin-wet aggregate can be placed on the aggregate-applying surface and remain stationary. On either side of this aggregate-applying surface, this flattening leaves curved sides which bend around to the lower surface of the composite aggregate structure. Then, at both ends 34 of the composite laminate structure, the upper surface and lower surface of the composite laminate structure should be clamped together at the juncture point between the edge of the aggregate-applying surface and the curved sides of the flattened composite laminate structure. This will hold the planar aggregate-applying surface in place. The curved edges should be covered from exposure by plastic.

At this point, rock aggregate particles should be dipped into a fourth hardenable thermosetting resin, which again may be the same resin used for the first three resin layers. The preferred rock aggregate particles used for the liner embodiment have a maximum dimension ranging in size from 6 millimeter to 12 millimeter. One third of the total rock aggregate particles which are to cover the entire surface of the liner embodiment 22 should be removed from the fourth hardenable thermosetting resin once they are coated with a resin coat which is between 0.1 and 0.25 millimeters thick.

These rock aggregate particles are then placed upon the aggregate-applying surface. The rock aggregate particles should then be allowed to remain stationary until the fourth hardenable thermosetting resin flows to the bottom of each rock aggregate particle and forms the concave resin meniscus used to anchor the rock aggregate particles to the composite laminate structure. At this point, the fourth hardenable thermosetting resin should be heated until it hardens, thus completing the bond between the rock aggregate particles and the composite laminate structure.

Figure 16:
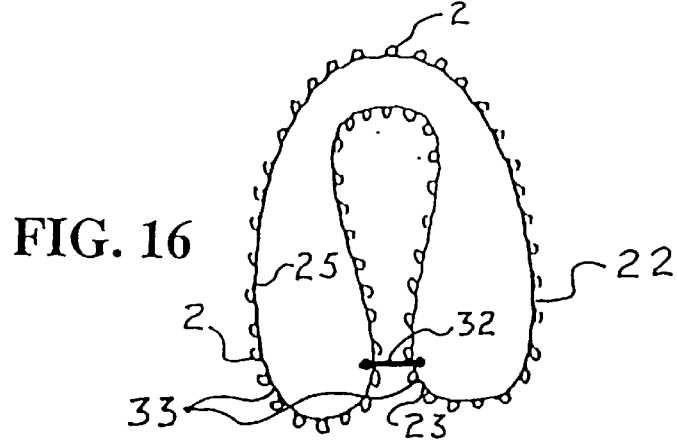
FIG. 16 is a cross section view of the folded configuration of an aggregate-covered filament-wound composite concrete pipe liner.
Figure 17:
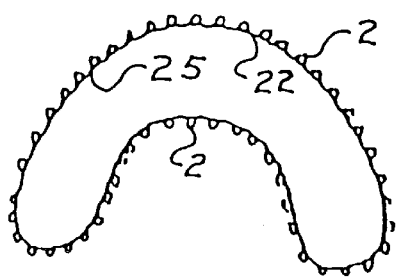
FIG. 17 is a cross section view of the aggregate-covered concrete pipe liner being unfolded after insertion within a rotating mixture of wet concrete.
Figure 18:
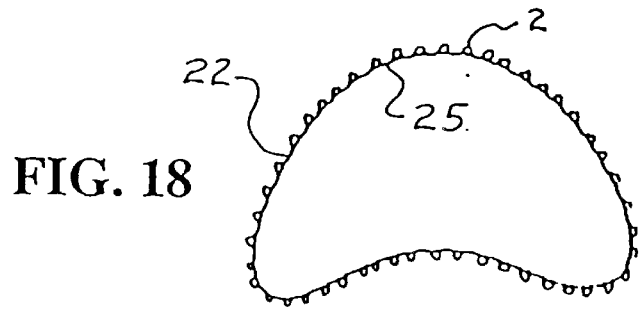
FIG. 18 is a cross section view of the aggregate-covered concrete pipe liner after it has unfolded within a rotating mixture of wet concrete.

A principal discovery disclosed in the present invention relates to the density distribution or spacing of the rock aggregate protuberances 2 bonded to the cylindrical composite laminate structure. Since the aggregate coated liner embodiment 22 is folded as shown in FIG. 16 before being inserted into a rotating pipe mandrel 26 (FIG. 19) whose inner surface is coated with a layer of wet concrete mix 27, liner embodiment 22 unfolds in the sequence shown first by FIG. 17 and subsequently by FIG. 18 before retaking its completely cylindrical form, shown in FIG. 14. However, because the liner embodiment 22 is flexible, the portion of the rotating pipe liner having the greatest mass 28 will be most quickly pressed against the wet concrete mix by the centrifugal force set up by the rotating mandrel, and thus will be the first portion of the liner embodiment to contact the wet concrete. This can be used to alleviate a common problem in centrifugally cast concrete pipe construction, which is that the most liquid and sandy parts of the concrete mix tend to collect in the center portion of the pipe, weakening the center of the pipe. If the mass of the rock aggregate protuberances bonded to the pipe liner laminate is greatest in the middle portion of the liner embodiment, then this middle portion will be first part of the liner embodiment to contact the liquid concrete mixture and will force the adjacent liquid concrete mixture to move toward the rotating mandrel ends. If the density of the spacing of the rock aggregate protuberances gradually tapers toward the ends of the liner embodiment, the remaining portions of the liner embodiment will continue to force the liquid cement until each gradually come in contact with the liquid cement until it is forced to the ends, where it can be trimmed away. This activity additionally will force the concrete to completely enclose each aggregate protuberance 2.

Accordingly, as shown in FIG. 13, the rock aggregate protuberances 2 should be placed such that their density, and thus their mass, is greatest in the middle 28 and least at the end portions of the liner embodiment. Note that here the middle and ends of the liner embodiment are defined according to the longitudinal axis of the liner embodiment.

After the first one-third of the rock aggregate particles are bonded to the flattened composite laminate structure, the plastic covering the curved edges should be removed, the clamps should be removed, and the cylindrical composite laminate structure should be rotated by 120 degrees. Then, the process used to bond the first one-third of the rock aggregate particles to the composite laminate structure is repeated on the second 120 degree arc of the cylindrical composite laminate structure. The composite laminate structure is flattened and clamped so that a second aggregate-applying planar surface is formed having one edge abutting the first, aggregate-covered aggregate-applying surface, and the two new curved edges are covered with plastic. The second third of resin-covered rock aggregate particles are applied to the composite laminate structure with the same concentrated center density gradually tapering toward the ends. The second third of rock particles are again allowed to stand until the resin meniscus structures form, and then are heated so that the fourth hardenable thermosetting resin will bond the rock aggregate particles to the composite laminate structure. Finally, the plastic is again removed from the curved edges of the composite laminate structure, the clamps are removed, and the composite laminate is again rotated by 120 degrees, and the process is repeated a last time to covering the last one-third of the surface of the cylindrical composite laminate structure with the last one-third of the rock aggregate particles. At this point, the second step of making the preferred liner embodiment 22 is completed.

Figures 19, 20:
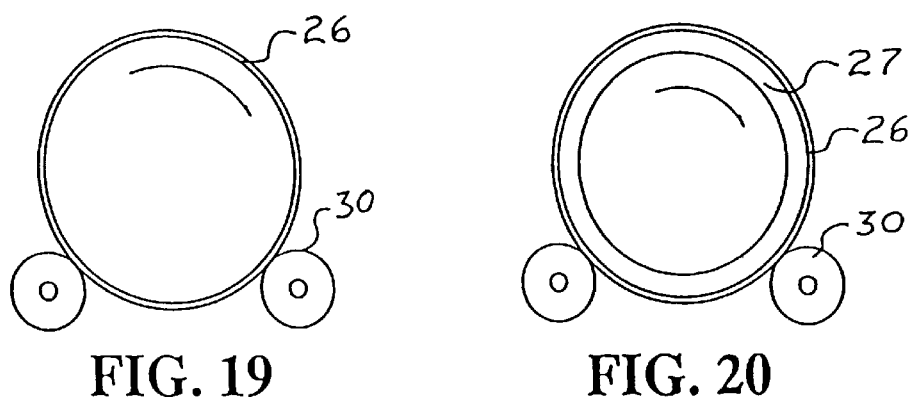
FIG. 19 is a schematic view of the steel pipe forming cylinder and the cylinder support apparatus used to make centrifugally cast concrete pipe.
FIG. 20 depicts the schematic view of FIG. 19 wherein a wet concrete mixture is placed within the rotating steel cylinder.

The third and final step in the process of making a concrete pipe using liner embodiment 22 is to make the aggregate-coated cylindrical composite laminate structure a structural constituent of the concrete pipe. The recommended sequence of operations used to insert liner embodiment 22 into the concrete pipe is illustrated in FIGS. 19, 20, 21, 22, 23 and FIG. 24. FIG. 19 is a schematic end view of the cylindrical rotating pipe mandrel 26 used to form the centrifugally cast concrete pipe. The mandrel 26 is supported on motorized rotating drive wheels 30 that control the rotational speed of the mandrel, and thereby the centrifugal force imposed on the concrete mixture 27 and on the folded concrete pipe liner 23 placed within the rotating mandrel. The mandrel should first be rotated at a speed sufficient to press wet concrete mix inserted into the rotating mandrel against the inner surface of the mandrel to form a pipe structure of approximately equal thickness along the full length of the mandrel. Speeds in the range of 30 to 120 rpm are appropriate; a preferred speed is 60 rpm. Second, wet concrete mix should be so inserted into the rotating mandrel and allowed to make the described pipe structure. FIG. 20 is a schematic end view of the mandrel 26 that shows the liquid concrete mixture 27 after it has been placed within the rotating pipe mandrel 26 and allowed to form a pipe structure.

Figures 21, 22:
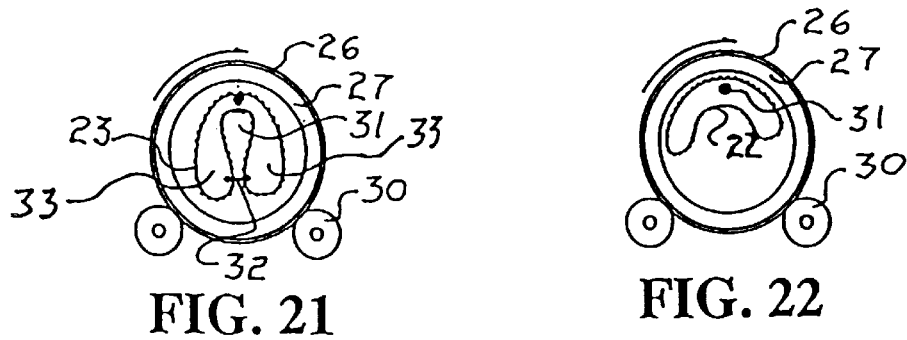
FIG. 21 depicts the schematic view of FIG. 20 wherein a folded and clipped aggregate-covered composite liner is inserted into the rotating wet concrete mixture.
FIG. 22 depicts the schematic view of FIG. 21 wherein the aggregate-covered composite liner begins to unfold due to centrifugal force after it is unclipped.

Next, the aggregate-covered liner embodiment 22 should be inserted into the rotating pipe mandrel. A preferred method of carrying out the insertion is to insert a metal laminate support pole 31 through the center of the cylindrical composite laminate structure and to fold the composite laminate structure with a longitudinal crease directly beneath the metal laminate support pole, creating two hanging folded portions 33 of the composite laminate structure, as shown in FIGS. 16 and 21. The metal laminate support pole 31 should have a length greater than the length of the rotating pipe mandrel so that the pole can be fully extended through the pipe mandrel with accessible portions at either end of the pipe mandrel. The two abutting, innermost edges of the two hanging folded portions of the composite laminate structure should then be clamped together with removable clips 32 at each end 34 of the composite laminate structure to hold the composite laminate structure in this position. The metal laminate support pole 31, supporting the composite laminate structure 23, should then be inserted in this folded position into the rotating mandrel 26. FIG. 21 shows the position of the folded composite laminate structure 23 as it is inserted in the rotating pipe mandrel while supported by metal laminate support pole 31 and held at each end by removable clips 32. Clips 32 should each be attached to a clip-retrieval cord which can be pulled to release the clips and thereby allow the composite laminate structure to unfold.

A preferred method of suspending metal support pole 31 within the rotating pipe mandrel is described as follows. A pole support cable (not shown) having a length at least twice the length of the concrete pipe mandrel is inserted through the concrete pipe mandrel and secured to hang below the upper surface of the concrete pipe mandrel by a distance approximately equal to twice the intended concrete pipe wall thickness. Movable cable trolleys are then affixed to the pole support cable, and the laminate support pole is hung from the pole support cable by the cable trolleys. The laminate support pole may then be moved into the concrete pipe mandrel such that the folded composite laminate structure is completely inside the concrete pipe mandrel by moving the cable trolleys along the pole support cable.

Once the composite laminate structure, suspended from the metal laminate support pole 31, is completely inserted into the rotating concrete pipe mandrel 26, the removable clips 32 should be retrieved by pulling upon their respective clip retrieval cords. At this point, the speed of rotation of the pipe mandrel 26 should be set such that sufficient centrifugal force is created to press the aggregate-covered composite 23 laminate structure firmly against the wet concrete 27. Again, speeds in the range of 30 to 120 rpm are appropriate, and a preferred rotation speed is 60 rpm. FIGS. 22, 23, and 24 show how the composite laminate structure unfolds once the clips 32 are removed and embeds itself into the wet concrete 27 to become an integral structural constituent of the completed concrete pipe 24. Note that the metal laminate support pole 31 is preferably suspended near the upper portion of the concrete pipe mandrel so that the uppermost portion of the composite laminate structure is quickly pressed into the wet concrete mix against the force of gravity, while the lower portions of the composite laminate structure will naturally fall to the bottom of the concrete pipe mandrel due to both gravity and centrifugal force.

It may also be noted that, since the larger stone and gravel constituents of the concrete mix are the first to be pressed against the inner surface of rotating pipe mandrel 26, due to centrifugal force, the inner-most portion of the pipe concrete mix contacting the rock aggregate protuberances 2 of the composite laminate structure 23 is more fluid and has a higher proportion of sand and cement. For this reason, larger-sized rock aggregate in the gravel portion of the concrete mix will not impede the enclosure of the rock aggregate protuberances bonded to the composite laminate structure by the rotating concrete mix.

Once the cylindrical composite laminate structure is embedded in the wet concrete mix, the pipe mandrel 26 should be maintained at the same speed of rotation until the wet cement dries. At this point, the composite laminate structure 23 has become a structural constituent of the concrete pipe 24 formed by the wet concrete mix 27, and a completed reinforced concrete pipe is formed. The completed reinforced concrete pipe can then be trimmed and removed from the pipe mandrel.

An alternative preferred cylindrical embodiment of the inventive concrete reinforcement structure in which aggregate protuberances are bonded to the inner surface of the cylindrical structure utilizes the completed aggregate-covered cylindrical concrete reinforcement structure finished after step two. The cylindrical composite laminate structure itself may be rotated upon rotating support rollers to generate an internal centrifugal force. Rock aggregate protuberances coated with resin as for the cylindrical liner embodiment above are inserted into the rotating cylindrical composite laminate structure and spread across the inner surface of the composite laminate structure will then be pressed against that inner surface by the centrifugal force. An appropriate range of rotation speeds again is from 30 to 120 rpm. The cylindrical composite laminate structure is then continued in rotation until the resin coating the rock aggregate flows to the base of the rock aggregate protuberances to form a concave resin meniscus between each rock aggregate protuberance and the inner surface of the rotating composite laminate structure, and until the resin coating the rock aggregate protuberances and forming the concave resin menisci hardens. At this point the cylindrical composite laminate structure can be removed from the rotating support rollers and used as a cylindrical pipe mandrel for making a concrete pipe, where the cylindrical pipe mandrel would form the outer surface of the concrete pipe. Alternatively, if the cylindrical composite laminate structure is to be used as the outer surface for a concrete column, concrete should be poured into the rotating cylindrical composite laminate structure and allowed to harden while the structure rotates.

Although the foregoing invention has been described in some detail by way of illustration for purposes of clarity of understanding, it will be readily apparent to those of ordinary skill in the art in light of the teachings of this invention that certain changes and modifications may be made thereto without departing from the spirit or scope of the appended claims.

We claim:

1. A multiple ply composite concrete reinforcement structure comprising:
   a first ply of unidirected continuous filament reinforcements, said unidirected continuous filament reinforcements bonded together by a first hardenable thermosetting polymeric resin matrix; and
   a second ply comprising a plurality of separately spaced protuberances, each of said protuberances individually coated with a second hardenable thermosetting polymeric resin;
   said second hardenable thermosetting polymeric resin bonding said second ply to said first ply by forming a concave resin meniscus which anchors each of said protuberances to said first ply of unidirected continuous filament reinforcements.

2. The multiple ply composite concrete reinforcement structure of claim 1 wherein said protuberances are aggregate rock particles all separated from each other by a distance in the range of from 1 millimeter to 20 millimeters, each said aggregate rock particle having a maximum cross-sectional width through its center in the range of 3 millimeters to 20 millimeters.

3. The multiple ply composite concrete reinforcement structure of claim 2 wherein said first hardenable thermosetting polymeric resin matrix and said second hardenable thermosetting polymeric resin each contain a styrene monomer selected from the class of unsaturated polyester resins that include isophthalic polyester, orthophthalic polyester, and vinyl esters.

4. The multiple ply composite concrete reinforcement structure of claim 2 wherein said first hardenable thermosetting polymeric resin matrix and said second hardenable thermosetting polymeric resin each are selected from the class of two component resin systems that include epoxies and polyurethanes.

5. The multiple ply composite concrete reinforcement structure of claim 2 wherein said unidirected continuous filament reinforcements are composed from a borosilicate E glass and have a filament diameter in the range of 10 to 25 microns.

6. The multiple ply composite concrete reinforcement structure of claim 5 wherein said first hardenable thermosetting polymeric resin matrix is a polyester resin having a viscosity in the range of 300 to 400 centipoise.

7. The multiple ply composite concrete reinforcement structure of claim 6 wherein said first ply of unidirected continuous filament reinforcements is impermeable and comprises a first layer and a second layer of biaxial unidirected filament reinforcements, said first and said second layers of biaxial unidirected filament reinforcements each having a filament orientation, said filament orientation of said first layer perpendicular to said filament orientation of said second layer.

8. The multiple ply composite reinforcement structure of claim 7 in combination with a cast concrete structural member, said combination producing a reinforced cast concrete structural member wherein said multiple ply composite concrete reinforcement structure is a structural constituent of said cast concrete structural member.

9. The reinforced cast concrete structural member of claim 8 wherein the concrete forming said cast concrete structural member is a hardenable mixture of sand, water, portland cement and gravel.

10. The reinforced cast concrete structural member of claim 9 wherein said multiple ply composite reinforcement structure is in the form of a flat panel.

11. The reinforced cast concrete structural member of claim 10 wherein said cast concrete structural member is a concrete beam and said multiple ply composite reinforcement structure is the bottom exterior structural constituent of said concrete beam.

12. The reinforced cast concrete structural member of claim 10 wherein said cast concrete structural member is a cantilever concrete beam and said multiple ply composite reinforcement structure is the top exterior structural constituent of said cantilever concrete beam.

13. The reinforced cast concrete structural member of claim 8, further comprising a second multiple ply composite concrete reinforcement structure which is a structural constituent of said cast concrete structural member.

14. The reinforced cast concrete structural member of claim 13 wherein said cast concrete structural member is a concrete panel and said first and said second composite concrete reinforcement structures form the outer exterior structural constituents of said concrete panel.

15. The reinforced cast concrete structural member of claim 13 wherein said first and said second composite concrete reinforcement structures are aligned with and adjoined to each other in a back-to-back formation such that both said second plies of each said composite concrete reinforcement structure are oriented outward, wherein said cast concrete structural member forms an interior region, and wherein said back-to-back formation of said first and second composite concrete reinforcement structures are embedded within said interior region of said cast concrete structural member.

16. The multiple ply composite concrete reinforcement structure of claim 7 wherein said multiple ply composite concrete reinforcement structure is cylindrically shaped.

17. The multiple ply composite concrete reinforcement structure of claim 8 wherein said cast concrete structural member is a centrifugally cast concrete pipe and said multiple ply composite concrete reinforcement structure is the interior liner of said centrifugally cast concrete pipe.

18. The multiple ply composite concrete reinforcement structure of claim 8 wherein said cast concrete structural member is a cylindrical concrete column having an exterior surface, wherein said multiple ply composite concrete reinforcement structure forms the exterior surface of said cylindrical concrete column, and wherein said cylindrical concrete column is cast within said cylindrical form of said multiple ply composite concrete reinforcement structure.

19. A method for making a concrete panel structure having a composite-reinforced outer surface, said composite-reinforced outer surface having a desired contour shape, comprising the steps of:
   constructing on a panel support structure a flat smooth panel forming surface having a contour shape identical to said desired contour shape for said composite-reinforced outer surface;
   coating said panel forming surface with a resin release agent;
   covering said panel forming surface with a coating of a first thermosetting coating resin;
   curing said coating of said first thermosetting coating resin until it is firm;
   placing upon said cured coating of said first thermosetting coating resin a single thickness of dry unidirected fabric containing parallel filament reinforcements;
   applying a layer of a second thermosetting impregnating resin matrix upon said single thickness of dry unidirected fabric;

smoothing the surface of said applied layer of said second thermosetting impregnating resin matrix such that said parallel filament reinforcements contained within said single thickness of dry unidirected fabric are uniformly coated with said second thermosetting impregnating resin matrix to a thickness at least equal to said single thickness of dry unidirected fabric;

curing said layer of said second thermosetting impregnating resin matrix until it is no longer liquid, such that a coated ply of unidirected continuous filament reinforcements is formed from said cured coating of said first thermosetting coating resin, said single thickness of dry unidirected fabric, and said cured layer of said second thermosetting impregnating resin matrix, said coated ply of unidirected continuous filament reinforcements having an upper outer surface defined by said smoothed surface of said layer of said second thermosetting impregnating resin matrix;

preparing a third liquid hardenable aggregate-coating thermosetting polyester resin having a viscosity in the range of from 350 to 1000 centipoise;

washing and drying a desired quantity of rock aggregate particles having a maximum dimension which ranges in size from 3 millimeters to 20 millimeters;

placing said rock aggregate particles in a container filled with said third aggregate-coating thermosetting polyester resin;

removing said resin-wet rock aggregate particles from said container when said rock aggregate particles are each individually coated with a resin coat of said third aggregate-coating thermosetting polyester resin, said resin coat having a thickness ranging from 0.1 to 0.5 millimeters;

placing said aggregate particles upon said upper outer surface of said coated ply of unidirected continuous filament reinforcements such that they are separated from each other by a distance ranging from 1 millimeter to 20 millimeters;

subjecting said coated ply of unidirected continuous filament reinforcements with said aggregate particles placed upon its said upper outer surface to a natural force normal to said upper outer surface, such that some of said resin coat flows to the base of each of said aggregate particles, forming a concave meniscus of said third aggregate-coating thermosetting polyester resin between each of said aggregate particles and said coated ply of unidirected continuous filament reinforcements;

heat curing said resin coat of said third aggregate-coating thermosetting polyester resin until it hardens and bonds each of said aggregate particles to said coated ply of unidirected continuous filament reinforcements, to form a bonded composite-reinforcing panel having an upper surface with exposed aggregate particles;

placing a desired thickness of flowable uncured concrete upon said upper surface of said bonded composite-reinforcing panel, to form a completed composite-reinforced concrete panel structure; and curing said completed composite-reinforced concrete panel structure.

20. A method for making a centrifugally cast concrete pipe having an impermeable liner reinforcement having a desired diameter and length, comprising the steps of:

placing a cylindrical mandrel in a filament winding machine, said cylindrical mandrel having a longitudinal axis and a mandrel forming surface, said mandrel forming surface having a diameter and length equal to said desired diameter and length of said impermeable liner reinforcement;

coating said mandrel forming surface with a resin release agent;

covering said mandrel forming surface with a 0.25 millimeter thick coating of a first thermosetting coating resin;

curing said 0.25 millimeter thick coating of said first thermosetting coating resin until it is firm;

placing upon said cured coating of said first thermosetting coating resin a 0.1 millimeter thick piece of dry woven fiberglass fabric, said dry woven fiberglass fabric being of a type identical to fabric Style 7628 and having a dry weight of 6 ounces per square yard;

applying a 0.25 millimeter thick layer of a second thermosetting fabric-impregnating resin upon said piece of dry woven fiberglass fabric such that said layer of said second thermosetting fabric-impregnating resin impregnates and coats said piece of dry woven fiberglass fabric;

placing upon said resin-coated piece of dry woven fiberglass fabric a 0.5 millimeter thick piece of dry unidirected fiberglass fabric, said piece of dry unidirected fiberglass fabric having a dry weight of 13 ounces per square yard and containing parallel fabric filament reinforcements;

orienting said piece of dry unidirected fiberglass fabric such that said parallel fabric filament reinforcements remain parallel to said longitudinal axis of said mandrel;

allowing said parallel fabric filament reinforcements to absorb said second thermosetting fabric-impregnating resin by capillarity;

passing a 0.75 millimeter thick filament winding ribbon prepared from parallel strands of E glass fiberglass roving having a yield of 450 yards per pound through a container filled with a third thermosetting filament-winding resin to make a resin-wet warp ribbon;

filament winding said resin-wet warp ribbon upon said piece of dry unidirected fiberglass fabric, thereby impregnating said piece of dry unidirected fiberglass fabric with said third thermosetting filament-winding resin;

curing said third thermosetting filament-winding resin until it hardens, forming a completed filament-wound cylindrical composite laminate structure from said 0.25 millimeter thick coating of said first thermosetting coating resin, said 0.1 millimeter thick piece of dry woven fiberglass fabric, said 0.25 millimeter thick layer of said second thermosetting fabric impregnating resin, said 0.5 millimeter thick piece of dry unidirected fiberglass fabric, said third liquid hardenable thermosetting filament-winding resin, and said 0.75 millimeter thick filament winding ribbon, said cylindrical composite laminate structure having a circumference, a length, a width, a height, and two circular ends;

removing said cylindrical composite laminate structure from the mandrel;

placing said cylindrical composite laminate structure atop a horizontal surface, thereby defining a first upper hemispherical surface and a first lower hemispherical surface;

flattening said cylindrical composite laminate structure such that said first upper hemispherical surface defines an approximately planar horizontally-disposed first aggregate-applying surface, said first aggregate-applying surface extending along the entirety of said length of said cylindrical composite laminate structure and having a width equal to approximately one-third of said circumference of said cylindrical composite laminate structure, and two first curved edges extending around towards said first lower hemispherical surface on opposing sides of said first aggregate-applying surface;

clamping said first upper hemispherical surface and said first lower hemispherical surface of said cylindrical composite laminate structure together at each of said two circular ends of said cylindrical composite laminate structure at the junctures between said first aggregate-applying surface and said first curved edges;

covering said first curved edges of said flattened cylindrical composite laminate structure with plastic such that only said first aggregate-applying surface is exposed;

preparing a fourth liquid aggregate-coating thermosetting resin having a viscosity in the range of 350 to 1000 centipoise;

washing and drying a desired quantity of rock aggregate particles each having a maximum dimension ranging in size from 6 millimeters to 12 millimeters;

placing said rock aggregate particles in a container filled with said fourth aggregate-coating thermosetting resin;

removing a first one third of said resin-wet rock aggregate particles from said container when they are each individually coated with a first resin coat of said fourth aggregate-coating thermosetting resin, said first resin coat having a thickness ranging from 0.1 to 0.25 millimeters;

placing said first one third of said resin-wet rock aggregate particles upon said exposed first aggregate-applying surface such that along said length of said cylindrical composite laminate surface said rock aggregate particles are spaced more closely in the center of said first aggregate-applying surface and less closely towards each of said circular ends of said cylindrical composite laminate surface, the spacing between said rock aggregate particles having a minimum of 0.1 millimeter and a maximum of 1.5 millimeter;

keeping said first one-third of said rock aggregate particles motionless until some of the fourth aggregate-coating thermosetting resin coating each said rock aggregate particle flows to the base of each said rock aggregate particle and produces a concave resin meniscus between the base of each said rock aggregate particle and said first aggregate-applying surface;

heating said fourth aggregate-coating thermosetting resin of said first resin coat until it hardens and bonds said first one-third of said rock aggregate particles to said first aggregate-applying surface;

removing said plastic covering said first curved edges of said flattened cylindrical composite laminate structure, unclamping said first upper hemispherical surface and said first lower hemispherical surface of said cylindrical composite laminate structure, and rotating said cylindrical composite laminate structure 120 degrees;

placing said once-rotated cylindrical composite laminate structure on said horizontal surface, thereby defining a second upper hemispherical surface and a second lower hemispherical surface;

flattening said cylindrical composite laminate structure such that said second upper hemispherical surface defines an approximately planar horizontally-disposed second aggregate-applying surface adjacent to said first aggregate-applying surface, said second aggregate-applying surface extending along the entirety of said length of said cylindrical composite laminate structure and having a width equal to approximately one-third of said circumference of said cylindrical composite laminate structure, and two second curved edges extending around towards said second lower hemispherical surface on opposing sides of said second aggregate-applying surface;

clamping said second upper hemispherical surface and said second lower hemispherical surface of said cylindrical composite laminate structure together at each of said two circular ends of said cylindrical composite laminate structure at the junctures between said second aggregate-applying surface and said second curved edges;

covering said second curved edges of said flattened cylindrical composite laminate structure with plastic such that only said second aggregate-applying surface is exposed;

removing a second one third of said resin-wet rock aggregate particles from said container when they are each individually coated with a second resin coat of said fourth aggregate-coating thermosetting resin, said second resin coat having a thickness ranging from 0.1 to 0.25 millimeters;

placing said second one-third of said resin-wet rock aggregate particles upon said exposed second aggregate-applying surface such that along said length of said cylindrical composite laminate surface said rock aggregate particles are spaced more closely in the center of said second aggregate-applying surface and less closely towards each of said circular ends of said cylindrical composite laminate surface, the spacing between said rock aggregate particles having a minimum of 0.1 millimeter and a maximum of 1.5 millimeter;

keeping said second one-third of said rock aggregate particles motionless until some of the fourth aggregate-coating thermosetting resin coating each said rock aggregate particle flows to the base of each said rock aggregate particle and produces a concave resin meniscus between the base of each said rock aggregate particle and said second aggregate-applying surface;

heating said fourth aggregate-coating thermosetting resin of said second resin coat until it hardens and bonds said second one-third of said rock aggregate particles to said second aggregate-applying surface;

removing said plastic covering said second curved edges of said flattened cylindrical composite laminate structure, unclamping said second upper hemispherical surface and said second lower hemispherical surface of said cylindrical composite laminate structure, and rotating said cylindrical composite laminate structure 120 degrees;

placing said twice-rotated cylindrical composite laminate structure on said horizontal surface, thereby defining a third upper hemispherical surface and a third lower hemispherical surface;

flattening said cylindrical composite laminate structure such that said third upper hemispherical surface defines an approximately planar horizontally-disposed third aggregate-applying surface adjacent to said first aggregate-applying surface along one longitudinal edge and adjacent to said second aggregate-applying surface along the opposing longitudinal edge, said third aggregate-applying surface extending along the entirety of said length of said cylindrical composite laminate structure and having a width equal to approximately one-third of said circumference of said cylindrical composite laminate structure, and two third curved edges extending around towards said third lower hemispherical surface on opposing sides of said third aggregate-applying surface;

clamping said third upper hemispherical surface and said third lower hemispherical surface of said cylindrical composite laminate structure together at each of said two circular ends of said cylindrical composite laminate structure at the junctures between said third aggregate-applying surface and said third curved edges;

covering said third curved edges of said flattened cylindrical composite laminate structure with plastic such that only said third aggregate-applying surface is exposed;

removing a third one third of said resin-wet rock aggregate particles from said container when they are each individually coated with a third resin coat of said fourth aggregate-coating thermosetting resin, said third resin coat having a thickness ranging from 0.1 to 0.25 millimeters;

placing said third one-third of said resin-wet rock aggregate particles upon said exposed third aggregate-applying surface such that along said length of said cylindrical composite laminate surface said rock aggregate particles are spaced more closely in the center of said third aggregate-applying surface and less closely towards each of said circular ends of said cylindrical composite laminate surface, the spacing between said rock aggregate particles having a minimum of 0.1 millimeter and a maximum of 1.5 millimeter;

keeping said third one-third of said rock aggregate particles motionless until some of the fourth aggregate-coating thermosetting resin coating each said rock aggregate particle flows to the base of each said rock aggregate particle and produces a concave resin meniscus between the base of each said rock aggregate particle and said third aggregate-applying surface;

heating said fourth aggregate-coating thermosetting resin of said third resin coat until it hardens and bonds said third one-third of said rock aggregate particles to said third aggregate-applying surface;

removing said plastic covering said third curved edges of said flattened cylindrical composite laminate structure and inserting a metal laminate support pole lengthwise through the interior of said cylindrical composite laminate structure between said clamped portions of said circular ends, said metal laminate support pole having a length longer than said length of said cylindrical composite laminate structure;

unclamping said third upper hemispherical surface and said third lower hemispherical surface of said cylindrical composite laminate structure;

lifting said metal laminate support pole, thereby suspending said cylindrical composite laminate structure from said metal laminate support pole;

folding said cylindrical composite laminate structure to create a single lengthwise crease directly beneath said metal laminate support pole such that two hanging folded portions of said cylindrical composite laminate structure are formed side-by side;

using two removable clips, each attached to a clip-retrieval cord, to clamp together at both of said circular ends of said cylindrical composite laminate structure the lowest-hanging portions of the innermost, abutting edges of said two hanging folded portions of said cylindrical composite laminate structure;

rotating a concrete pipe mandrel at a speed of 30 to 120 rpm, said concrete pipe mandrel having an inner surface, a length, a longitudinal axis, an inner central portion in the center of said concrete pipe mandrel with respect to said longitudinal axis, and two mandrel ends;

placing within said rotating concrete pipe mandrel a quantity of uncured concrete mix sufficient to produce the desired concrete thickness for said centrifugally cast concrete pipe;

continuing to rotate said concrete pipe mandrel at a speed of 30 to 120 rpm until said uncured concrete mix has attained an approximately uniform thickness over the inner surface of said concrete pipe mandrel as a result of the centrifugal force caused by said rotation, said centrifugal force also causing a surplus cement-sand mixture of the concrete mix to collect in said inner central portion of said concrete pipe mandrel;

inserting said metal laminate support pole and said folded and clipped cylindrical composite laminate structure suspended by said metal laminate support pole into said rotating concrete pipe mandrel;

maintaining said metal laminate support pole in stable position, said stable position being placed approximately on the vertical plane passing through said longitudinal axis of said pipe mandrel and closer to the upper half of said concrete pipe mandrel than to the lower half of said concrete pipe mandrel;

simultaneously pulling said clip-retrieval cords attached to said two removable clips to unclamp said innermost, abutting edges of said two hanging folded portions of said cylindrical composite laminate structure;

continuing to rotate said concrete pipe mandrel at 30 to 120 rpm until said resin-coated rock aggregate particles upon said cylindrical composite laminate structure have been embedded into said concrete mix and until said cylindrical composite laminate structure has pressed said surplus cement-sand mixture away from said inner central portion of said concrete pipe mandrel towards said mandrel ends;

continuing to rotate said concrete pipe mandrel at a speed of 30 to 120 rpm until said concrete mix has hardened and said cylindrical composite laminate structure has become a structural constituent of a completed cast concrete pipe;

trimming and removing said completed composite-reinforced cast concrete pipe from said concrete pipe mandrel.

21. The method for making a centrifugally cast concrete pipe having an impermeable liner reinforcement of claim 20, wherein the step of maintaining said metal laminate support pole in stable position comprises the substeps of:

inserting a pole support cable through said concrete pipe mandrel, said pole support cable having a length greater than or equal to twice said length of said concrete pipe mandrel;

securing said pole support cable such that said pole support cable hangs below the upper surface of said concrete pipe mandrel by a distance approximately equal to twice said desired concrete thickness for said centrifugally cast concrete pipe;

attaching cable trolleys to said pole support cable, said cable trolleys movable along said pole support cable and attachable to and detachable from said metal laminate support pole;

attaching said metal laminate support pole to said movable cable trolleys;

moving said metal laminate support pole such that said suspended folded composite laminate structure is fully inside said concrete pipe mandrel by moving said cable trolleys along said pole support cable.

22. A method for making an aggregate-coated cylindrical pipe mandrel, comprising the steps of:

filament winding a cylindrical composite laminate structure on a removable mandrel;

removing said filament-wound cylindrical composite laminate structure from said removable mandrel;

supporting said filament-wound cylindrical composite laminate structure on rotating support rollers;

preparing a liquid aggregate-coating thermosetting resin having a viscosity in the range of 350 to 1000 centipoise;

washing and drying a desired quantity of rock aggregate particles each having a maximum dimension ranging in size from 6 millimeters to 12 millimeters;

placing said rock aggregate particles in a container filled with said liquid aggregate-coating thermosetting resin;

removing said resin-wet rock aggregate particles from said container when they are each individually coated with a resin coat of said liquid aggregate-coating thermosetting resin, said resin coat having a thickness ranging from 0.1 to 0.25 millimeters;

rotating said filament-wound cylindrical composite laminate structure at 30 to 120 rpm, causing a centrifugal force to arise within said rotating cylindrical composite laminate structure;

inserting said resin-coated rock aggregate particles into said rotating cylindrical composite laminate structure and uniformly dispersing said resin-coated rock aggregate particles within said rotating cylindrical composite laminate structure such that they are separated from each other by a distance ranging from 2 millimeters to 20 millimeters;

using said centrifugal force to produce a concave resin meniscus between each said resin-coated rock aggregate particle and the inner surface of said rotating cylindrical composite laminate structure;

rotating said cylindrical composite laminate structure until said aggregate-coating thermosetting resin hardens, forming a completed aggregate-covered cylindrical pipe mandrel; and removing said completed aggregate-covered cylindrical pipe mandrel from said rotating support rollers.

23. A method for making a composite-reinforced concrete column comprising the steps of:

filament winding a cylindrical composite laminate structure on a removable mandrel;

removing said filament-wound cylindrical composite laminate structure from said removable mandrel;

supporting said filament-wound cylindrical composite laminate structure on rotating support rollers;

preparing a liquid aggregate-coating thermosetting resin having a viscosity in the range of 350 to 1000 centipoise;

washing and drying a desired quantity of rock aggregate particles each having a maximum dimension ranging in size from 6 millimeters to 12 millimeters;

placing said rock aggregate particles in a container filled with said liquid aggregate-coating thermosetting resin;

removing said resin-wet rock aggregate particles from said container when they are each individually coated with a resin coat of said liquid aggregate-coating thermosetting resin, said resin coat having a thickness ranging from 0.1 to 0.25 millimeters;

rotating said filament-wound cylindrical composite laminate structure at 30 to 120 rpm, causing a centrifugal force to arise within said rotating cylindrical composite laminate structure;

inserting said resin-coated rock aggregate particles into said rotating cylindrical composite laminate structure and uniformly dispersing said resin-coated rock aggregate particles within said rotating cylindrical composite laminate structure such that they are separated from each other by a distance ranging from 2 millimeters to 20 millimeters;

using said centrifugal force to produce a concave resin meniscus between each said resin-coated rock aggregate particle and the inner surface of said rotating cylindrical composite laminate structure;

rotating said cylindrical composite laminate structure until said aggregate-coating thermosetting resin hardens;

placing a liquid concrete mix into said rotating cylindrical composite laminate structure;

rotating said cylindrical composite laminate structure until said concrete mix hardens, said cylindrical composite laminate structure, said resin-coated rock aggregate particles bound to said cylindrical composite laminate structure by said concave resin menisci, and said hardened concrete mix together forming a completed composite-reinforced concrete column; and removing said completed composite-reinforced concrete column from said rotating support rollers.

* * * * *